US008838449B2

(12) United States Patent
Ju et al.

(10) Patent No.: US 8,838,449 B2
(45) Date of Patent: Sep. 16, 2014

(54) WORD-DEPENDENT LANGUAGE MODEL

(75) Inventors: Yun-Cheng Ju, Bellevue, WA (US);
Ivan J. Tashev, Kirkland, WA (US);
Chad R. Heinemann, Lynnwood, WA (US)

(73) Assignee: Microsoft Corporation, Redmond, WA (US)

(*) Notice: Subject to any disclaimer, the term of this patent is extended or adjusted under 35 U.S.C. 154(b) by 335 days.

(21) Appl. No.: 12/977,461

(22) Filed: Dec. 23, 2010

(65) Prior Publication Data
US 2012/0166196 A1 Jun. 28, 2012

(51) Int. Cl.
*G10L 15/04* (2013.01)
*G06F 17/30* (2006.01)
*G10L 15/19* (2013.01)

(52) U.S. Cl.
CPC ..................................... *G10L 15/19* (2013.01)
USPC .............................................. 704/254; 707/5

(58) Field of Classification Search
CPC . G06F 17/2818; G06F 17/2827; G06F 17/27; G06F 17/271
USPC .......................................................... 704/254
See application file for complete search history.

(56) References Cited

U.S. PATENT DOCUMENTS

| | | | |
|---|---|---|---|
| 5,280,563 A * | 1/1994 | Ganong | 704/200 |
| 5,349,645 A * | 9/1994 | Zhao | 704/243 |
| 5,675,706 A | 10/1997 | Lee et al. | |
| 5,842,165 A * | 11/1998 | Raman et al. | 704/255 |
| 5,848,388 A * | 12/1998 | Power et al. | 704/239 |
| 5,909,666 A * | 6/1999 | Gould et al. | 704/251 |
| 6,006,185 A * | 12/1999 | Immarco | 704/251 |
| 6,076,056 A * | 6/2000 | Huang et al. | 704/254 |
| 6,085,160 A * | 7/2000 | D'hoore et al. | 704/256.2 |
| 6,125,345 A * | 9/2000 | Modi et al. | 704/240 |
| 6,286,043 B1* | 9/2001 | Cuomo et al. | 709/223 |
| 6,366,882 B1* | 4/2002 | Bijl et al. | 704/235 |
| 6,424,943 B1* | 7/2002 | Sherwood et al. | 704/244 |
| 6,535,850 B1* | 3/2003 | Bayya | 704/239 |
| 6,964,608 B1* | 11/2005 | Koza | 463/9 |
| 6,983,247 B2* | 1/2006 | Ringger et al. | 704/251 |
| 7,010,484 B2* | 3/2006 | Lin | 704/240 |
| 7,031,918 B2* | 4/2006 | Hwang | 704/243 |
| 7,120,582 B1* | 10/2006 | Young et al. | 704/255 |

(Continued)

OTHER PUBLICATIONS

Chen, et al., "A—Admissible Key-Phrase Spotting With Sub-Syllable Level Utterance Verification" Retrieved at << http://wkd.iis.sinica.edu.tw/~lfchien/publication/iscslp98.pdf>>, pp. 4.

(Continued)

*Primary Examiner* — James Wozniak
*Assistant Examiner* — Timothy Nguyen
(74) *Attorney, Agent, or Firm* — Steve Wight; Carole Boelitz; Micky Minhas

(57) ABSTRACT

This document describes word-dependent language models, as well as their creation and use. A word-dependent language model can permit a speech-recognition engine to accurately verify that a speech utterance matches a multi-word phrase. This is useful in many contexts, including those where one or more letters of the expected phrase are known to the speaker.

18 Claims, 6 Drawing Sheets

(56) References Cited

U.S. PATENT DOCUMENTS

| | | | |
|---|---|---|---|
| 7,251,600 B2* | 7/2007 | Ju et al. | 704/257 |
| 7,275,034 B2* | 9/2007 | Odell et al. | 704/255 |
| 7,529,665 B2* | 5/2009 | Kim et al. | 704/236 |
| 7,634,407 B2* | 12/2009 | Chelba et al. | 704/251 |
| 7,895,039 B2* | 2/2011 | Braho et al. | 704/251 |
| 2001/0053968 A1* | 12/2001 | Galitsky et al. | 704/9 |
| 2003/0220796 A1* | 11/2003 | Aoyama et al. | 704/275 |
| 2006/0206313 A1* | 9/2006 | Xu et al. | 704/10 |
| 2007/0065787 A1* | 3/2007 | Raffel et al. | 434/177 |
| 2007/0100635 A1* | 5/2007 | Mahajan et al. | 704/276 |
| 2007/0239453 A1* | 10/2007 | Paek et al. | 704/257 |
| 2007/0271086 A1* | 11/2007 | Peters et al. | 704/9 |
| 2008/0133508 A1* | 6/2008 | Jiang et al. | 707/5 |
| 2008/0177545 A1 | 7/2008 | Li et al. | |
| 2009/0070112 A1* | 3/2009 | Li et al. | 704/257 |
| 2010/0088097 A1* | 4/2010 | Tian et al. | 704/251 |
| 2010/0161334 A1* | 6/2010 | Kang et al. | 704/251 |
| 2011/0093269 A1* | 4/2011 | Braho et al. | 704/251 |
| 2012/0271631 A1* | 10/2012 | Weng et al. | 704/243 |
| 2012/0330968 A1* | 12/2012 | Lee et al. | 707/748 |

OTHER PUBLICATIONS

Sukkar et al., "Utterance Verification of Keyword Strings using Word-Based Minimum Verification Error (Wb-Mve) Training", May, 1996, pp. 4.

Yu, et al., "An Effective and Efficient Utterance Verification Technology Using Word N-gram Filler Models" Retrieved at << http://research.microsoft.com/pubs/76934/2006-dongyu-interspeech.pdf>>, Sep. 2006, pp. 4.

Caminero, et al., "On-line Garbage Modeling with Discriminant Analysis for Utterance Verification"Retrieved at << http://citeseerx.ist.psu.edu/viewdoc/download?doi=10.1.1.16.4883&rep=rep1&type=pdf>>,1996, pp. 4.

Gupta, et al., "Improved Utterance Rejection Using Length Dependent Thresholds" Retrieved at << http://www.shlrc.mq.edu.au/proceedings/icslp98/PDF/AUTHOR/SL981040.PDF>>, Dec. 1998, pp. 4.

Boves, et al., "ASR for Automatic Directory Assistance: The SMADA Project" Retrieved at <<http://lia.univ-avignon.fr/fileadmin/documents/Users/Intranet/fich_art/LIA--210-asr2000.pdf >>, 2000, pp. 6.

* cited by examiner

WORD-DEPENDENT LANGUAGE MODEL

BACKGROUND

Speech-recognition engines using many conventional speech-recognition algorithms receive a speech utterance, determine phrases of words that are likely based on this speech utterance, and output a most-likely phrase. These algorithms, however, are often not accurate enough to verify that a speech utterance matches an expected phrase, especially when one or more letters or words of the expected phrase are known to the speaker.

SUMMARY

This document describes techniques for creating and using a word-dependent language model. In some embodiments, a word-dependent language model enables a speech-recognition engine to more accurately verify that a speech utterance matches an expected phrase.

This summary is provided to introduce simplified concepts for word-dependent language models that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses creating and/or using a word-dependent language model are described with reference to the following drawings. The same numbers are used throughout the drawings to reference like features and components.

DETAILED DESCRIPTION

Overview

This document describes word-dependent language models, as well as their creation and use. A word-dependent language model can permit a speech-recognition engine to accurately verify that a speech utterance matches a multi-word phrase.

Consider a case where a verification-consuming application, such as a trivia-based video game, attempts to learn whether a user's spoken answer matches an expected answer to a question presented to the user. Many conventional speech-recognition utterance verification algorithms are used to verify speech based on complete phrases for a complete utterance and with little or no context. Thus, many conventional algorithms may recognize, with a similar confidence, the following three phrases for a single user utterance: "It's a Wandering Life," "It's a Wonderful Like," and "It's My Wonderful Life." If the expected answer is "It's a Wonderful Life," these recognized phrases would not match the expected answer but in many cases would each be verified to be correct.

Consider this same example but where the techniques create a word-dependent language model that enables a speech-recognition engine to more-accurately verify a multi-word phrase. Here assume that the techniques know the expected phrase "It's a Wonderful Life" and a general context about the answer, namely that the video game has given a hint of "'It's A _____ Li_____'." The techniques create a word-by-word language module that not only enables the recognition engine to verify word-by-word, but also to assign accuracy thresholds based on this context. Thus, the importance of the accuracy of the "It's" and "A" and "Life" may be lower, as the video game has exposed parts or all these to the user, and thus high accuracy is not needed. The "_____" word of the phrase, however, can be assigned a very high accuracy threshold, as that is the key to the answer being correct. Thus, the speech-recognition engine having the created word-dependent language model may not verify as correct "It's a Wandering Life" but instead only "It's a Wonderful Life" uttered by the user.

This is but one example of techniques creating and using word-dependent language models—others are described below. This document now turns to an example system in which the techniques can be embodied, after which various example methods for performing the techniques are described.

Example System

Figure 1:
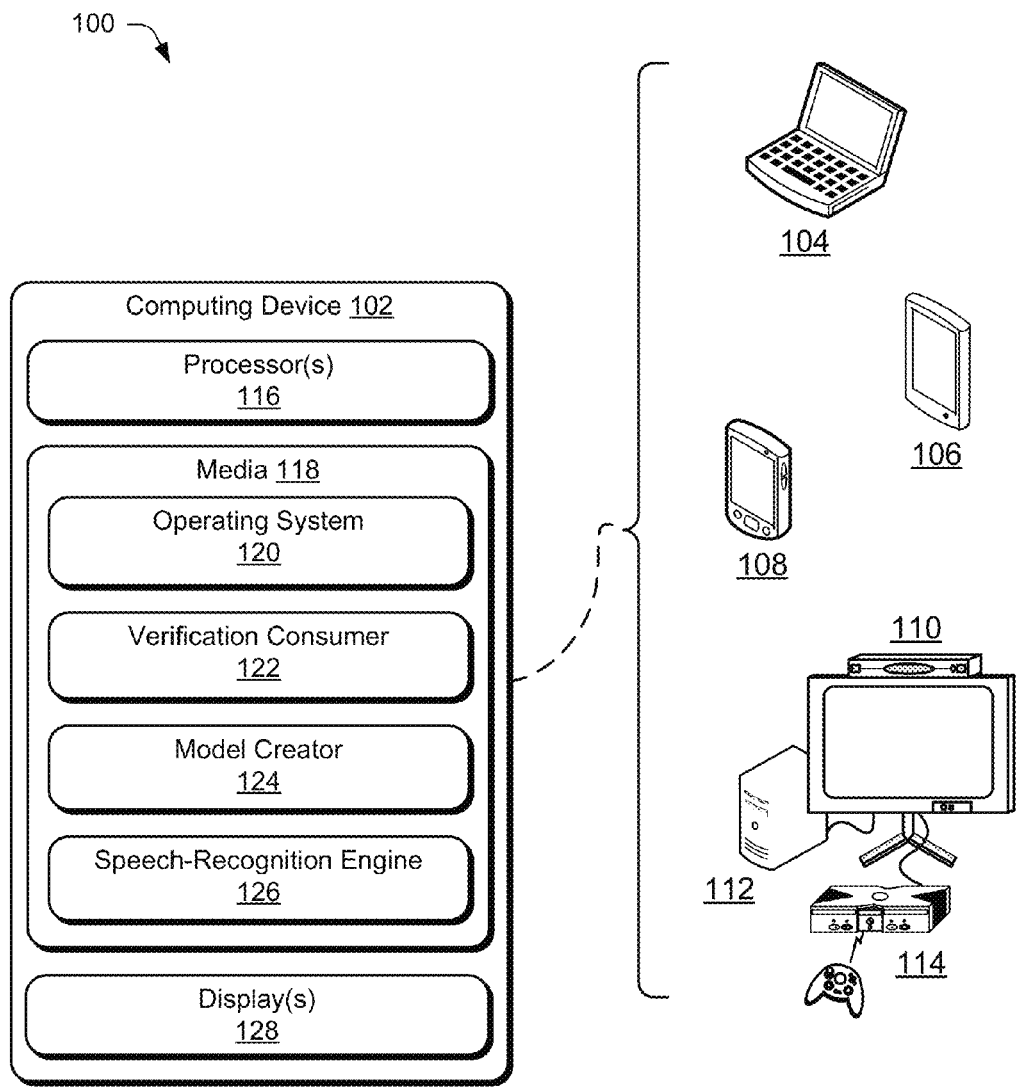
FIG. 1 illustrates an example system in which techniques creating and/or using a word-dependent language model can be implemented.

FIG. 1 illustrates an example system 100 in which techniques creating and/or using a word-dependent language model can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, verification consumer 122, model creator 124, and speech-recognition engine 126. Computing device 102 also includes or has access to one or more displays 128, four examples of which are illustrated in FIG. 1.

Verification consumer 122 is an application that uses verification of human speech relative to an expected multi-word response, generally to provide services or access. Examples include security systems or applications (for a bank, to login to a computer, to provide a password, etc.) and various video games, to name just a few.

Model creator 124 creates and/or uses word-dependent language models. Model creator 124 may use an expected response and context of this response to create a word-dependent language model. This model can be used by speech-recognition engine 126 to verify one or more human utterances, such as to confirm that an utterance matches a multi-word phrase.

Verification consumer 122, model creator 124, and speech-recognition engine 126 can be separate from each other or combined or integrated in some form. In some cases, these entities may be disparate but capable of communicating, such as with verification consumer 122, model creator 124, or speech-recognition engine 126 being a cloud-provided service communicated with over a communication network.

Example Methods

Figure 2:
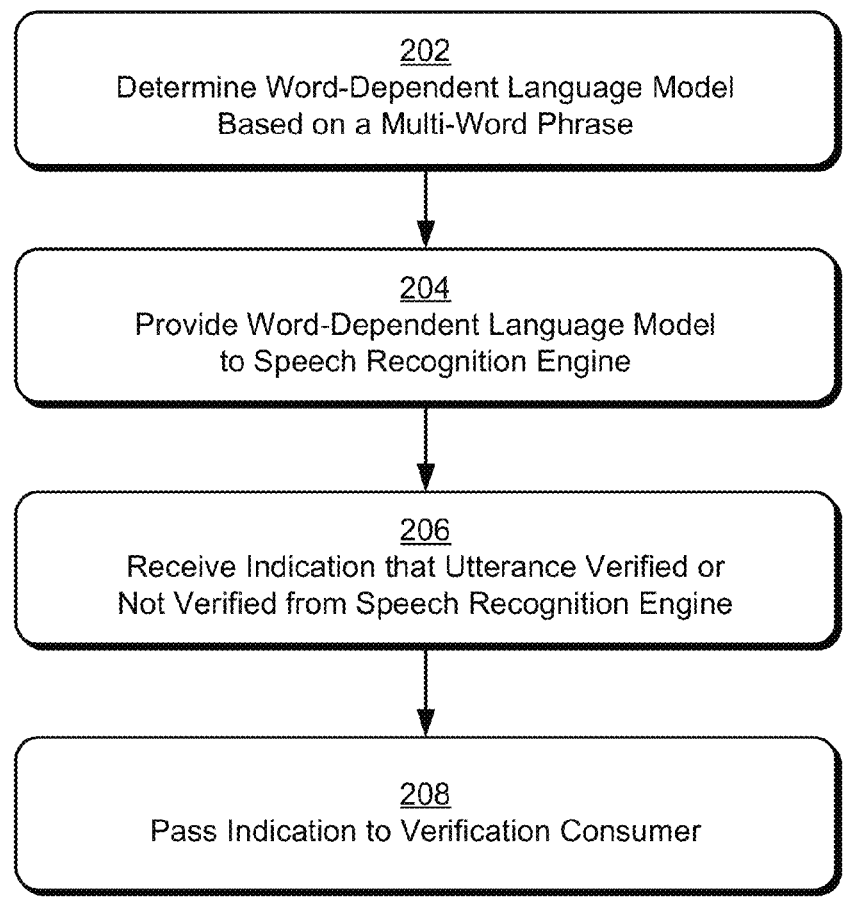
FIG. 2 illustrates an example method for creating and using a word-dependent language model.

FIG. 2 depicts a method 200 for creating and using a word-dependent language model. This method is shown as a set of blocks that specify operations performed but is not necessarily limited to the order shown for performing the operations by the respective blocks. In portions of the following discussion reference may be made to system 100 of FIG. 1, reference to which is made for example only.

Block 202 determines, based on a multi-word phrase, a word-dependent language model. This model is specific to the multi-word phrase and can enable a speech-recognition engine to perform a sequential, word-level speech verification of one or more human utterances. Various example multi-word phrases, as well as context for these phrases, are described below.

Figure 3:
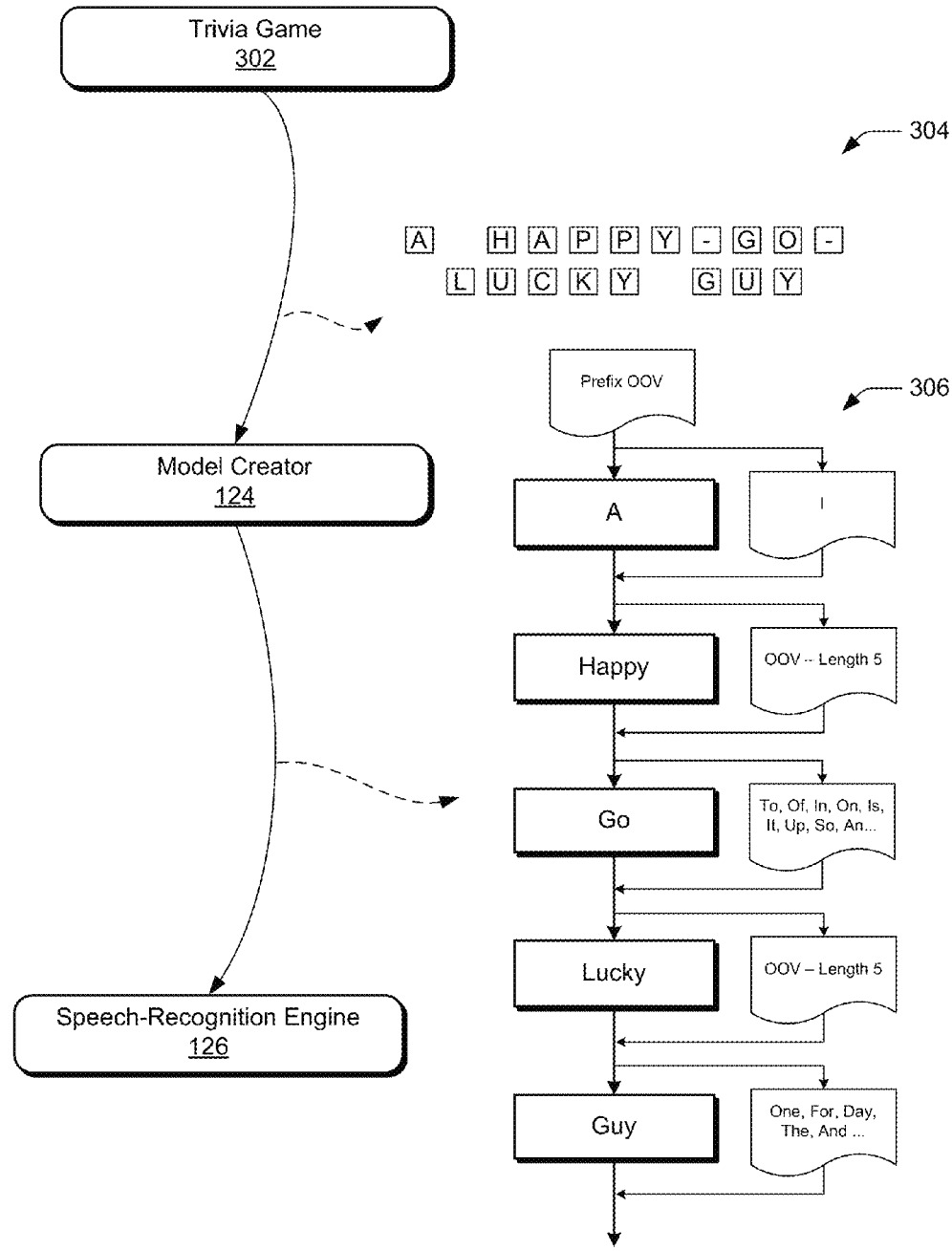
FIG. 3 illustrates an example trivia game, multi-word phrase, and word-dependent language model created based on the multi-word phrase.

Consider, by way of a first example, FIG. 3, which illustrates a trivia game 302 for speech-enable trivia phrases. This trivia game 302 displays in a game interface blank spaces for an expected multi-word phrase that, over time, are filled in based on user-selected consonants and vowels. Here assume that model creator 124 receives, from trivia game 302, an expected multi-word phrase 304 as shown in FIG. 3 none of which is yet exposed to the user.

In this example, model creator 124 creates, based on this received multi-word phrase 304, a word-dependent language model 306, also illustrated (in simplified form) in FIG. 3.

Block 202 determines a word-dependent language model based on the words themselves, for example the fact that there are five words in a particular order. Block 202 may also create a model based on information about the multi-word phrase and about the situation in which the utterance is received. This information includes context about the multi-word phrase, such as lengths of words, words considered to be more or less important, and adjacent words. The situation in which the utterance is made can also be used, such as letters or words exposed to a person making the utterance. Various examples of these ways in which to create a word-dependent language model are described below.

In this example of FIG. 3, model creator 124 creates model 306 based on the words and their order in the received phrase 304 as well as the lengths of the words in the phrase. Thus, note that model 306 includes a vocabulary usable by speech-recognition engine 126 for three of the five words, namely "I" for an imposter of the "A" word of the phrase, "To, Of, In, On, Is, It, Up, So, An . . . " and others omitted for brevity in the illustration for the imposters of the "Go" word, and "One, For, Day, The, And . . . " and many others also omitted for brevity for the "Guy" word. These sets of vocabulary words, together with other popular fillers like "something" or "bla bla", can be used as part of an in-vocabulary recognition algorithm of the speech-recognition engine, though this is not required.

Similarly, block 202 may determine, based on a length of a word in the multi-word phrase, higher-probability wrong words instead of or in conjunction with determining a set of words having the length. Again considering the ongoing example, model creator 124 uses a length of the other two words, here "Happy" and "Lucky," though a full vocabulary list is not provided (there are many five-letter words in most languages). Note that the speech-recognition engine receiving and using the word-dependent language model does not know the expected phrase. The word dependent language model enables the speech-recognition engine to emphasize differently different portions of the utterance. The greater the information in the word-dependent language model (e.g., the more words provided in a parallel branch) the higher the accuracy threshold. Further, the word-dependent language model can be built by the techniques to assign different weights associated with a parallel branch, thereby controlling the sensitivity of the verification performed by a speech-recognition engine.

Model creator 124 uses the length of these words to provide some five-letter words that have a higher probability of being uttered. While higher-probability words are provided, they are likely to be used as part of an out-of-vocabulary recognition algorithm ("OOV") of speech-recognition engine 126 (OOV also referred to in the art in some cases as "garbage model" or "garbage algorithm"). These higher-probability words can be selected based on a history of wrong words used by a user or by users generally (e.g., tracked by a provider of trivia game 302 or the particular game), as well as common words uttered or used in the relevant language having the length of the word of the multi-word phrase (e.g., five letters for phrase 304). Further, the length of the expected word alone can be provided by the model effective to enable a speech-recognition engine to weigh some words more highly when verifying the relevant portion of the utterance.

Returning to method 200, block 204 provides the word-dependent language model of the multi-word phase to a speech-recognition engine. The word-dependent language model can be created to conform to a speech-recognition engine's expected format for models, and thus be used by a speech-recognition engine without modification. In other cases, however, the speech-recognition engine is altered, modified, or integral with the creator of the word-dependent language model. Example methods describing operations of a speech-recognition engine are set forth elsewhere herein.

Block 206 receives, from the speech-recognition engine and responsive to the speech-recognition engine receiving one or more human utterances associated with the multi-word phrase, an indication that the one or more utterances is verified or not verified to be the multi-word phrase.

Block 208 passes this indication to a verification consumer. Note that in some cases an entity creating the word-dependent language model is integral with the verification consumer. In still other cases the indication at block 206 is provided directly to the verification consumer rather than to the entity that provided the model (e.g., model creator 124). In any of these various cases, the verification consumer receives the indication.

Continuing the ongoing example of FIG. 3, assume that the utterance received by speech-recognition engine 126 is not verified as matching the expected phrase. This is passed to trivia game 302, in response to which the game indicates, through a game interface, that the answer is incorrect and continues to another player.

As the game continues, various letters of multi-word phrase 304 are exposed. Consider FIG. 4, which illustrates exposed letters 402 of multi-word phrase 304 with placement of letters missing being shown with dark-lined boxes. Exposed letters 402 may look similar to how they are shown to players of the game on display 128.

Block 202 may also use these exposed letters to create a word-dependent language model or alter an existing model. Thus, these exposed letters provide context usable by model creator 124 and can be used a first time a model is built or later to modify a model.

Continuing the ongoing example, assume that model creator 124 receives exposed letters after creating word-dependent language model 306 as the trivia game progresses. In response, model creator 124 alters model 306 based on the exposed letters, which provides context of the situation in which an utterance is received (the players know of these letters).

Figure 4:
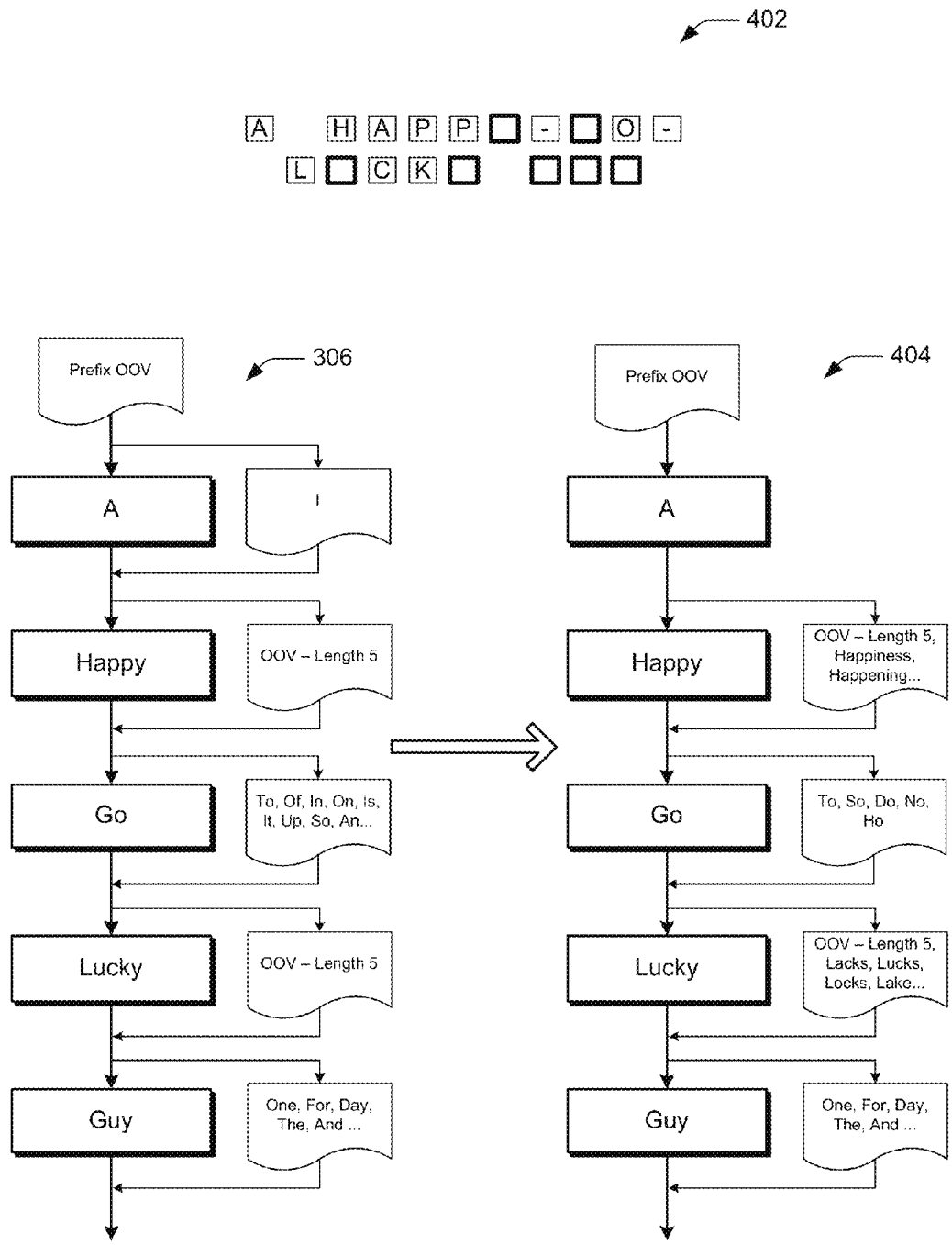
FIG. 4 illustrates exposed letters of the multi-word phrase of FIG. 3 and a word-dependent language model created based on these exposed letters.

This altered, word-dependent language model 404 is illustrated in FIG. 4. Note the differences between model 404 and model 306, also illustrated in FIG. 4, namely an instruction to ignore the first word (the "A" is known), adding likely wrong words for "Happy" based on a user's utterance likely starting with "Happ", reducing the vocabulary for "Go" based on the "O" being exposed (To, So, Do, No, Ho), adding likely wrong words for "Lucky" based on the "L_CK_" being exposed, and no change for "Guy."

As is readily apparent, the verification accuracy can be made very high for an utterance based on this model 404, namely that speech-recognition engine 126 can require a high accuracy threshold for the "Guy" word but less for "Happy" and "Lucky", none or very little for "A", and a greater ability to correctly verify based on the small vocabulary for the "Go" word.

This example is but one case where block 202 determines, based on a complete word (here the "A") of the multi-word phrase having been revealed to a person from which the one or more human utterances are expected, that the complete word does not need to be verified. Word-dependent language model 404 indicates this by not having a competing branch for imposter words.

This example is also but one case where block 202 determines, based on one or more letters and letter locations of a word in the multi-word phrase (the "o" in "Go" and the "Happ" in "Happy") that are known to a person from which the one or more human utterances are expected, a set of words having the one or more letters (e.g., "To, So, do, No, Ho").

This discussion now turns to operations by a speech-recognition engine using a word-dependent language model.

Figure 5:
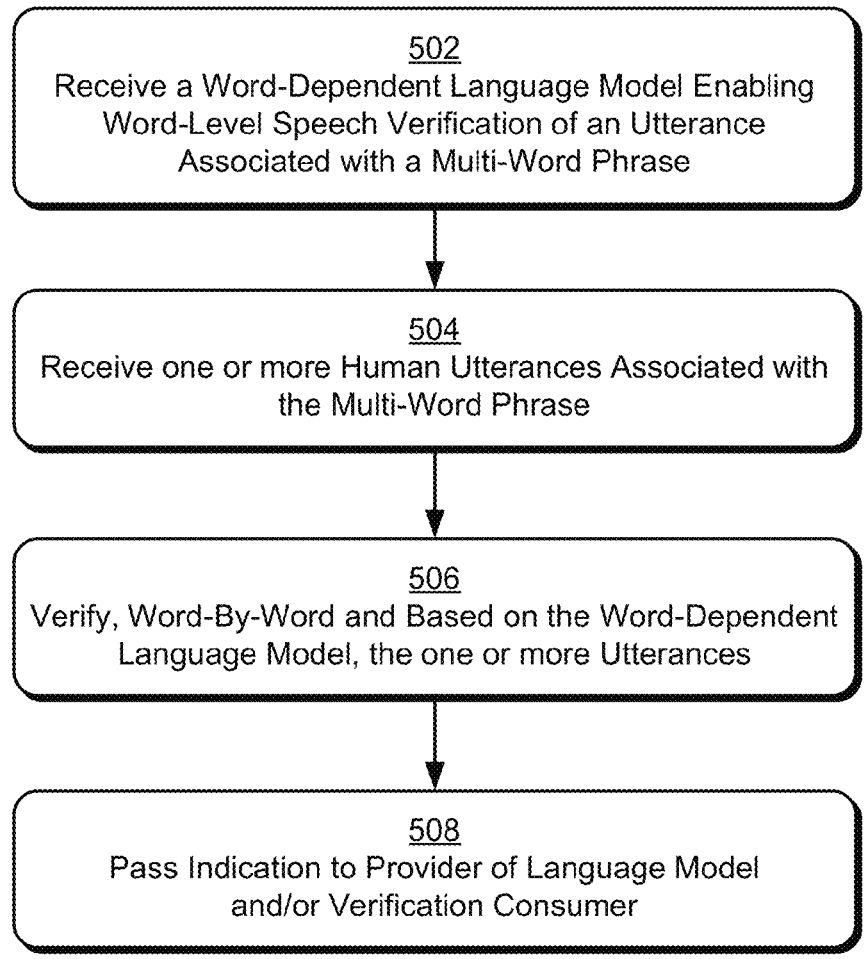
FIG. 5 illustrates an example method for using a word-dependent language model, at least a portion of the method performed by a speech-recognition engine.

FIG. 5 depicts a method 500 using a word-dependent language model. This method is shown as a set of blocks that specify operations performed but is not necessarily limited to the order shown for performing the operations by the respective blocks. In portions of the following discussion reference may be made to system 100 of FIG. 1, reference to which is made for example only.

Block 502 receives a word-dependent language model enabling word-level speech verification of an utterance associated with a multi-word phrase. At some point block 504 receives one or more human utterances associated with the multi-word phrase, though this may be slightly before, after, or commensurate with receiving the language model. This association between the utterance received and the word-dependent language model is assumed based on the situation in which the utterance is received. Thus, when a security system asks a user to answer a question, the utterance received immediately or soon after the question is asked is deemed a response to the question. This utterance is then verified against an expected answer to the question.

Returning to FIG. 3, note that word-dependent language model 306 can be used by speech-recognition engine 126 word-by-word and sequentially. Thus, for an utterance or utterances received, speech-recognition engine 126 may verify portions of the utterance sequentially and portion-by-portion. This alone enables accuracy, as verifying a word via a portion of an utterance is generally more accurate than verifying multiple words via a full utterance. This word-by-word verification is enabled by the techniques based on the grammar or structure of the multi-word phrase, such as when a prior word ends and a next word begins in the phrase. This grammar and structure is used in creating word-dependent language models, such as model 306.

Other aspects of the word-dependent language model also enable accuracy, such as a more-limited vocabulary, word-lengths, likely wrong words, and so forth.

Block 506 verifies, word-by-word and based on the word-dependent language model, that the one or more utterances does or does not include each word of the multi-word phrase. Assume, for example, that speech-recognition engine 126 receives word-dependent language model 404 of FIG. 4 and a second player's utterance in response to trivia game 302 exposing letters 402 of the multi-word phrase 304. Here assume that the player utters "A Happy Go Lucky Man." Speech-recognition engine 126 recognizes the "A" very easily, recognizes the three following words "Happy", "Go", "Lucky" relatively easy because of the smaller sets of imposter words in the parallel branches and that "Man" is most likely to be what the player said. The speech-recognition engine is unlikely to misrecognize the last word "Man" as "Guy" because of the rich set of imposter words in the parallel branch. In other words, with a high accuracy threshold. This high threshold is logical, as the utterance relies most on this particular, unexposed word for the utterance being correct.

Block 508 passes an indication of the results of the verification to the provider of the word-dependent language model and/or a verification consumer associated with the multi-word phrase.

Here trivia game 302 continues the game based on receiving an indication that the utterance is not the same as the multi-word phrase.

The preceding discussion describes methods relating to word-dependent language models. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in system 100 of FIG. 1 and/or example device 600 described below, which may be further divided, combined, and so on. Thus, system 100 and/or device 600 illustrate some of many possible systems or apparatuses capable of employing the described techniques. The entities of system 100 and/or device 600 generally represent software, firmware, hardware, whole devices or networks, or a combination thereof. In the case of a software implementation, for instance, the entities (e.g., verification consumer 122, model creator 124, and speech-recognition engine 126) represent program code that performs specified tasks when executed on a processor (e.g., processor(s) 116). The program code can be stored in one or more computer-readable memory devices, such as computer-readable storage media 118 or computer-readable media 614 of FIG. 6.

Example Device

Figure 6:
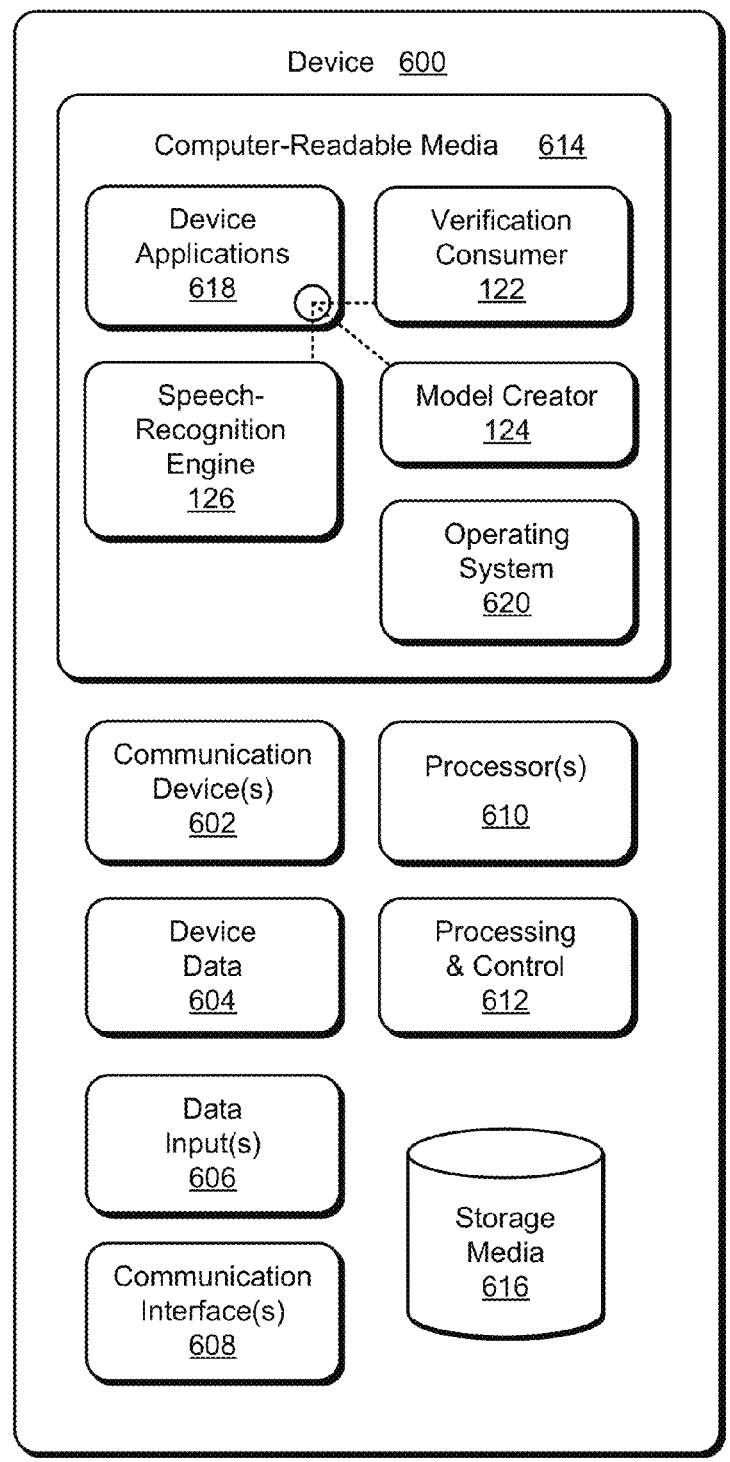
FIG. 6 illustrates an example device in which techniques for creating and/or using a word-dependent language model can be implemented.

FIG. 6 illustrates various components of example device 600 that can be implemented as any type of client, server, and/or computing device as described with reference to the previous FIGS. 1-5 to implement techniques that create or use a word-dependent language model. In embodiments, device 600 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 600 may also be associated with a user (e.g., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as human utterances, user-selectable inputs, messages, music, television media content, recorded video content, and any other type of audio, video, and/or image data received from any content and/or data source.

Device 600 also includes communication interfaces 608, which can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like), which process various computer-executable instructions to control the operation of device 600 and to enable techniques creating and/or using a word-dependent language model. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable storage media 614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable storage media 614 provides data storage mechanisms to store the device data 604, as well as various device applications 618 and any other types of information and/or data related to operational aspects of device 600. For example, an operating system 620 can be maintained as a computer application with the computer-readable storage media 614 and executed on processors 610. The device applications 618 may include a device manager, such as any form of a control application, software application, signal-processing and control module, code that is native to a particular device, a hardware abstraction layer for a particular device, and so on.

The device applications 618 also include any system components, engines, or modules to implement techniques using or creating a word-dependent language model. In this example, the device applications 618 can include verification consumer 122, model creator 124, and speech-recognition engine 126.

Conclusion

Although embodiments of techniques and apparatuses creating and using a word-dependent language model have been described in language specific to features and/or methods, it is to be understood that the subject of the appended claims is not necessarily limited to the specific features or methods described. Rather, the specific features and methods are disclosed as example implementations for a word-dependent language model.

What is claimed is:

1. A computer-implemented method comprising:
   determining, based on a multi-word phrase, a word-dependent language model specific to the multi-word phrase and enabling word-level speech verification, the word-dependent language model including different accuracy thresholds for at least two of the multiple words, the different accuracy thresholds including a highest accuracy threshold for a most important word in the multi-word phrase, the highest accuracy threshold generated by providing a greatest number of imposter words in the word-dependent language model for the most important word in the multi-word phrase, wherein determining the word-dependent language model determines, based on a length of the most important word in the multi-word phrase, a set of words having the length, and wherein the imposter words for the most important word in the word-dependent language model includes the set of words;
   providing the word-dependent language model of the multi-word phrase to a speech-recognition engine; and
   receiving, from the speech-recognition engine and responsive to the speech-recognition engine receiving one or more human utterances associated with the multi-word phrase, an indication that the one or more utterances is verified or not verified to be the multi-word phrase.

2. A computer-implemented method as described in claim 1, wherein the set of words can be used as part of an in-vocabulary recognition algorithm for a portion of the one or more human utterances associated with the word of the multi-word phrase.

3. A computer-implemented method as described in claim 1, wherein determining the word-dependent language model determines, based on one or more letters and letter locations of multiple words in the multi-word phrase that are known to a person from which the one or more human utterances are expected, the different accuracy thresholds for the at least two of the multiple words.

4. A computer-implemented method as described in claim 1, wherein determining the word-dependent language model determines, based on one or more letters and letter locations of a word in the multi-word phrase that are known to a person from which the one or more human utterances are expected, a set of words having the one or more letters, and further comprising including the set of words in the word-dependent language model.

5. A computer-implemented method as described in claim 1, wherein determining the word-dependent language model determines, based on a complete word of the multi-word phrase having been revealed to a person from which the one or more human utterances are expected, that the complete word does not need to be verified and further comprising including an indication that a portion of the one or more human utterances associated with this complete word does not need to be verified in the word-dependent language model.

6. A computer-implemented method as described in claim 1, wherein determining the word-dependent language model determines higher-probability wrong words based on a length of a word in the multi-word phrase, and further comprising including the higher-probability wrong words in the word-dependent language model.

7. A computer-implemented method as described in claim 6, wherein the higher-probability wrong words are intended to be used as part of an out-of-vocabulary recognition algorithm for a portion of the one or more human utterances associated with the word of the multi-word phrase.

8. A computer-implemented method as described in claim 1, wherein determining the word-dependent language model determines higher-probability wrong words based on a history of prior human utterances associated with a word in the multi-word phrase, and further comprising including the higher-probability wrong words in the word-dependent language model.

9. A computer-implemented method as described in claim 1, wherein determining the word-dependent language model determines higher-probability wrong words based on common usage in a language in which the one or more human utterances are expected, and further comprising including the higher-probability wrong words in the word-dependent language model.

10. A computer-implemented method as described in claim 1, wherein determining the word-dependent language model determines higher-probability wrong words for a word in the multi-word phrase based on one or more other words of the multi-word phrase that are adjacent to the word in the multi-word phrase, and further comprising including the higher-probability wrong words in the word-dependent language model.

11. A computer-implemented method as described in claim 1, wherein determining the word-dependent language model includes assigning different weights to different branches, each of the different branches associated with different words of the multi-word phrase and having one or more imposter words for respective different words of the multi-word phrase.

12. A computer-implemented method as described in claim 1, further comprising receiving the multi-word phrase from an entity and, responsive to receiving the indication that the one or more utterances is verified or not verified, passing the indication to the entity.

13. A system comprising:
one or more processors;
one or more memories comprising instructions stored thereon that, responsive to execution by the one or more processors, perform operations comprising:
determining, based on a multi-word phrase, a word-dependent language model specific to the multi-word phrase and enabling word-level speech verification, the word-dependent language model including different accuracy thresholds for at least two of the multiple words, the different accuracy thresholds including a highest accuracy threshold for a most important word in the multi word phrase, the highest accuracy threshold generated by providing a greatest number of imposter words in the word-dependent language model for the most important word in the multi-word phrase, wherein determining the word-dependent language model determines, based on a length of the most important word in the multi-word phrase, a set of words having the length, and wherein the imposter words for the most important word in the word-dependent language model includes the set of words;
providing the word-dependent language model of the multi-word phrase to a speech-recognition engine; and
receiving, from the speech-recognition engine and responsive to the speech recognition engine receiving one or more human utterances associated with the multi-word phrase, an indication that the one or more utterances is verified or not verified to be the multi-word phrase.

14. The system as described in claim 13, wherein the set of words can be used as part of an in-vocabulary recognition algorithm for a portion of the one or more human utterances associated with the word of the multi-word phrase.

15. The system as described in claim 13, wherein determining the word-dependent language model determines, based on one or more letters and letter locations of multiple words in the multi word phrase that are known to a person from which the one or more human utterances are expected, the different accuracy thresholds for the at least two of the multiple words.

16. The system as described in claim 13, wherein determining the word-dependent language model determines, based on one or more letters and letter locations of a word in the multi-word phrase that are known to a person from which the one or more human utterances are expected, a set of words having the one or more letters, and further comprising including the set of words in the word-dependent language model.

17. The system as described in claim 13, wherein determining the word-dependent language model determines, based on a complete word of the multi-word phrase having been revealed to a person from which the one or more human utterances are expected, that the complete word does not need to be verified and further comprising including an indication that a portion of the one or more human utterances associated with this complete word does not need to be verified in the word-dependent language model.

18. The system as described in claim 13, wherein determining the word-dependent language model determines higher probability wrong words based on a length of a word in the multi-word phrase, and further comprising including the higher-probability wrong words in the word-dependent language model.

* * * * *